(12) United States Patent
Toppani et al.

(10) Patent No.: US 8,191,935 B2
(45) Date of Patent: Jun. 5, 2012

(54) GLOVE BOX ASSEMBLY FOR A DASHBOARD OF A MOTOR VEHICLE

(75) Inventors: Nicolas Toppani, Turin (IT); Angela Falagario, Turin (IT)

(73) Assignee: Fiat Group Automobiles S.p.A., Corso Giovanni Agnelli (IT)

( * ) Notice: Subject to any disclaimer, the term of this patent is extended or adjusted under 35 U.S.C. 154(b) by 575 days.

(21) Appl. No.: 12/368,850

(22) Filed: Feb. 10, 2009

(65) Prior Publication Data
US 2009/0206625 A1  Aug. 20, 2009

(30) Foreign Application Priority Data

Feb. 12, 2008 (EP) .................................... 08425084

(51) Int. Cl.
*E05C 9/00* (2006.01)
(52) U.S. Cl. ................. 292/32; 292/DIG. 37; 296/37.12
(58) Field of Classification Search .................... 292/32, 292/33–37, DIG. 12, DIG. 11, DIG. 37, DIG. 4; 70/208, 210, DIG. 65, 159–162, 109, 53, 70/67, 68
See application file for complete search history.

(56) References Cited

U.S. PATENT DOCUMENTS

| | | | | |
|---|---|---|---|---|
| 4,355,837 A * | 10/1982 | Shimizu et al. | ............ | 296/37.12 |
| 5,190,314 A * | 3/1993 | Takasugi | ........................ | 280/752 |
| 5,273,310 A * | 12/1993 | Terai | .............................. | 280/732 |
| 6,513,354 B2 * | 2/2003 | Predd et al. | ...................... | 70/208 |
| 7,775,566 B2 * | 8/2010 | Hanjono et al. | .............. | 292/216 |
| 2002/0084666 A1 | 7/2002 | Toppani | | |
| 2008/0290682 A1 | 11/2008 | Sauer | | |

FOREIGN PATENT DOCUMENTS

| | | |
|---|---|---|
| DE | 39 32 909 | 4/1991 |
| DE | 10 2005 057 189 | 5/2007 |
| EP | 1 193 129 | 4/2002 |

OTHER PUBLICATIONS

European Search Report from corresponding EP Application No. 08 42 5084.4.

* cited by examiner

*Primary Examiner* — Carlos Lugo
*Assistant Examiner* — Mark Williams
(74) *Attorney, Agent, or Firm* — Alston & Bird LLP

(57) ABSTRACT

A glove box assembly for a dashboard of a motor vehicle has two glove box compartments adjacent to one another and associated with respective doors movable between an open position and a closed position; the glove box assembly has two retaining devices each associated with a relative door and releasable by manually operating respective control elements, which are both borne on one of the two doors; to open the other door, a transmission transmits the release command when the first door is in the closed position.

11 Claims, 4 Drawing Sheets

GLOVE BOX ASSEMBLY FOR A DASHBOARD OF A MOTOR VEHICLE

The present invention relates to a glove box assembly for a dashboard of a motor vehicle.

CROSS-REFERENCE TO RELATED APPLICATIONS

This application claims priority from European Patent Application No. EP08425084.4, filed Feb. 12, 2008, the contents of which are incorporated herein by reference.

BACKGROUND OF THE INVENTION

German patent application DE3932909A1 includes the features of the preamble of claim 1 and describes a dashboard of a motor vehicle comprising two glove box compartments, which are arranged one above the other and are provided with respective doors which are upwardly and, respectively, downwardly pivotable to open the glove box compartments.

The doors are held closed by a closing mechanism borne on a support structure arranged in a fixed position between the two glove box compartments. The closing mechanism comprises, for each door, a relative latch, which is movable between an engaged position, in which the door is held in the closed position, and a disengaged position, in which the door is released.

The latches can be fastened in the engaged position, either together or separately, by operating a key lock, which is also borne on the support structure between the two glove box compartments.

The known solution described above falls short of being satisfactory, in that the dimensions of the closing mechanism and the position in which the closing mechanism must be arranged on the dashboard between the two glove box compartments constitute constraints which are extremely limiting for the design of the space in the two glove box compartments and the design of the external profile of the dashboard and of the doors in terms of their aesthetical appearance. In particular, the outer edge of the doors must be appropriately shaped so as to define a recess to allow access to the lock and to the buttons that control the release of the latches.

SUMMARY OF THE INVENTION

The purpose of the present invention is to provide a glove box assembly for a dashboard of a motor vehicle, which overcomes the drawbacks described above in a simple and cost-effective manner.

According to the present invention a glove box assembly for a dashboard of a motor vehicle is produced, said assembly comprising:

a first and a second glove box compartment adjacent to one another;

a first and a second door movable between an open position and a closed position to open/close, respectively, said first and second glove box compartments; closing means comprising:

a first and a second manually operable control element;

a first and a second retaining device, which hold said first and, respectively, second door in the closed position and are releasable by manually operating said first and, respectively, said second control element to open said first and, respectively, second door;

characterized in that said first and second control element are borne on said first door; and in that it comprises transmission means for transmitting a release command from said second control element to said second retaining device when said first door is in the closed position.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION OF THE INVENTION

Figure 1:
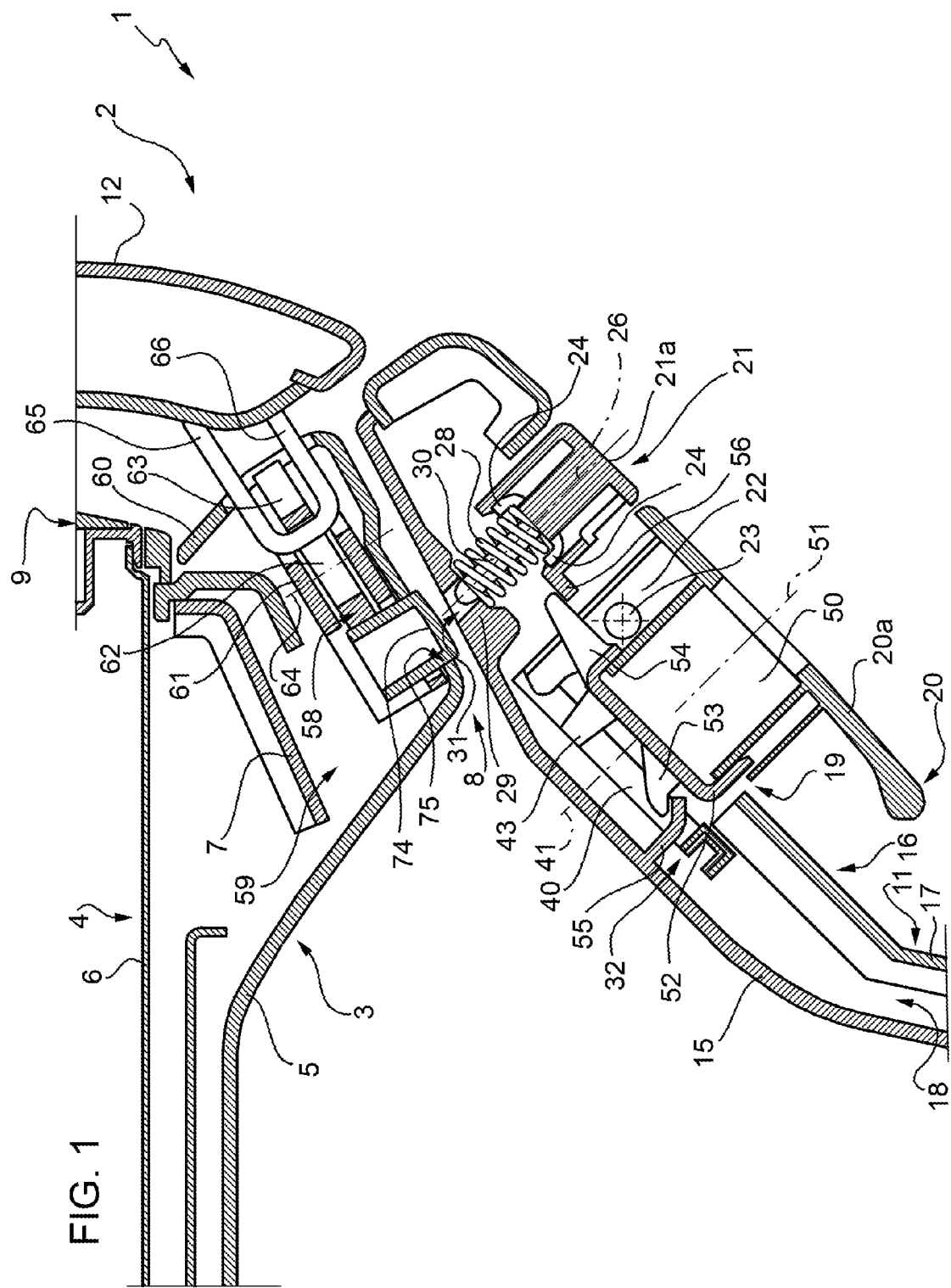
FIG. 1 shows a cross-section along a vertical plane and with some parts removed for the sake of clarity, of a preferred embodiment of the glove box assembly for a dashboard of a motor vehicle, according to the present invention.

In FIG. 1, number 1 indicates, as a whole, a dashboard of a motor vehicle (partially illustrated). The dashboard 1 has an external profile that delimits a passenger compartment of the motor vehicle to the front and comprises a glove box assembly 2 (partially illustrated), which, in turn, comprises two glove box compartments 3,4 arranged one beneath the other and defined by respective walls 5,6 fixed to a support structure 7 of the dashboard 1. The compartments 3,4 have respective openings 8,9, which can be opened or closed by means of respective doors 11,12. The doors 11,12 are downwardly and, respectively, upwardly pivotable from a closed position (FIG. 1) to an open position (not illustrated).

The door 11 comprises a wall 15 which delimits the compartment 3 when the door 11 is in the closed position. The door 11 also comprises a module 16, which is joined to the wall 15 in a fixed position and externally with respect to the compartment 3 and comprises a wall 17 opposite the wall 15, so as to define a cavity 18.

The wall 17 defines an opening 19 engaged by two control elements, which constitute part of the module 16 and are defined respectively by a lever 20 and a button 21 comprising respective manually operable plates 20a,21a.

The lever 20 comprises two appendices 22, which are fixed with respect to the plate 20a, extend in a cantilevered fashion into the cavity 18 and are pivotally connected to the wall 17 about a horizontal axis 23, so that the lever 20 is pivotable between a home position and a raised position (not illustrated). The button 21 is arranged above the lever 20 and is releasably connected to a portion 24 that is fixed with respect to the wall 17. The button 21 is guided by the portion 24 to slide along an axis 26 from a home position to a retracted position towards the wall 15. When the lever 20 and the button 21 are arranged in the home position, the plates 20a and 21a are flush with one another and with the edge of the opening 19.

A coil torsion spring 27 (FIG. 3) arranged along the axis 23 and a coil compression spring 28 arranged along the axis 26 between the button 21 and a portion 29 of the module 16 are provided to hold the lever 20 and, respectively, the button 21 in the home position. The spring 28 is arranged around a rod 30 which is fixed with respect to the plate 21a, extends along the axis 26 across the portion 24, in the cavity 18 and in a cantilevered fashion towards the wall 15, and is aligned with a hole 31 of the portion 29 and of the wall 15.

Figure 2:
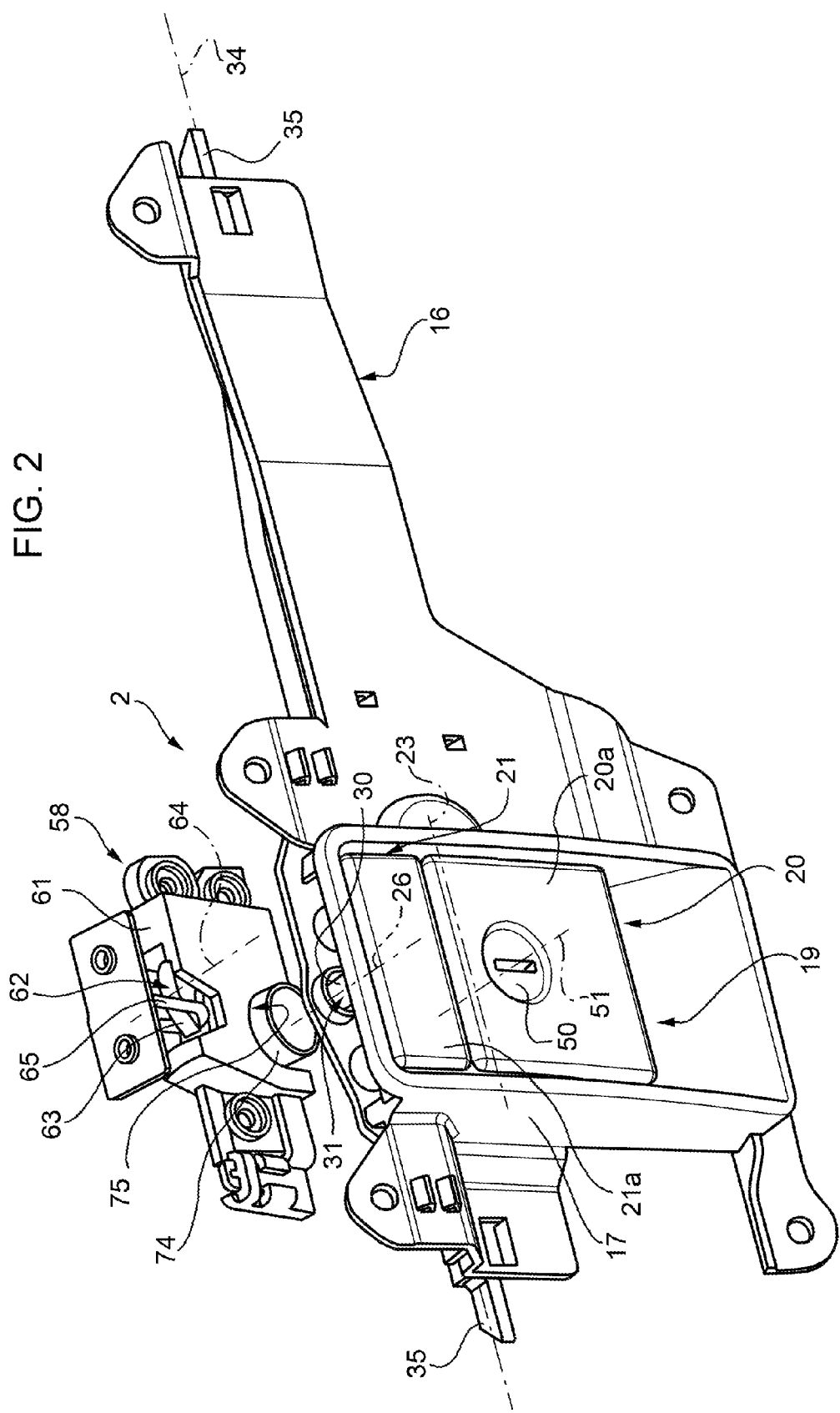
FIGS. 2 and 3 are perspective views from the front and, respectively, from the rear, with parts removed for the sake of clarity, of the glove box assembly of FIG. 1.
Figure 3:
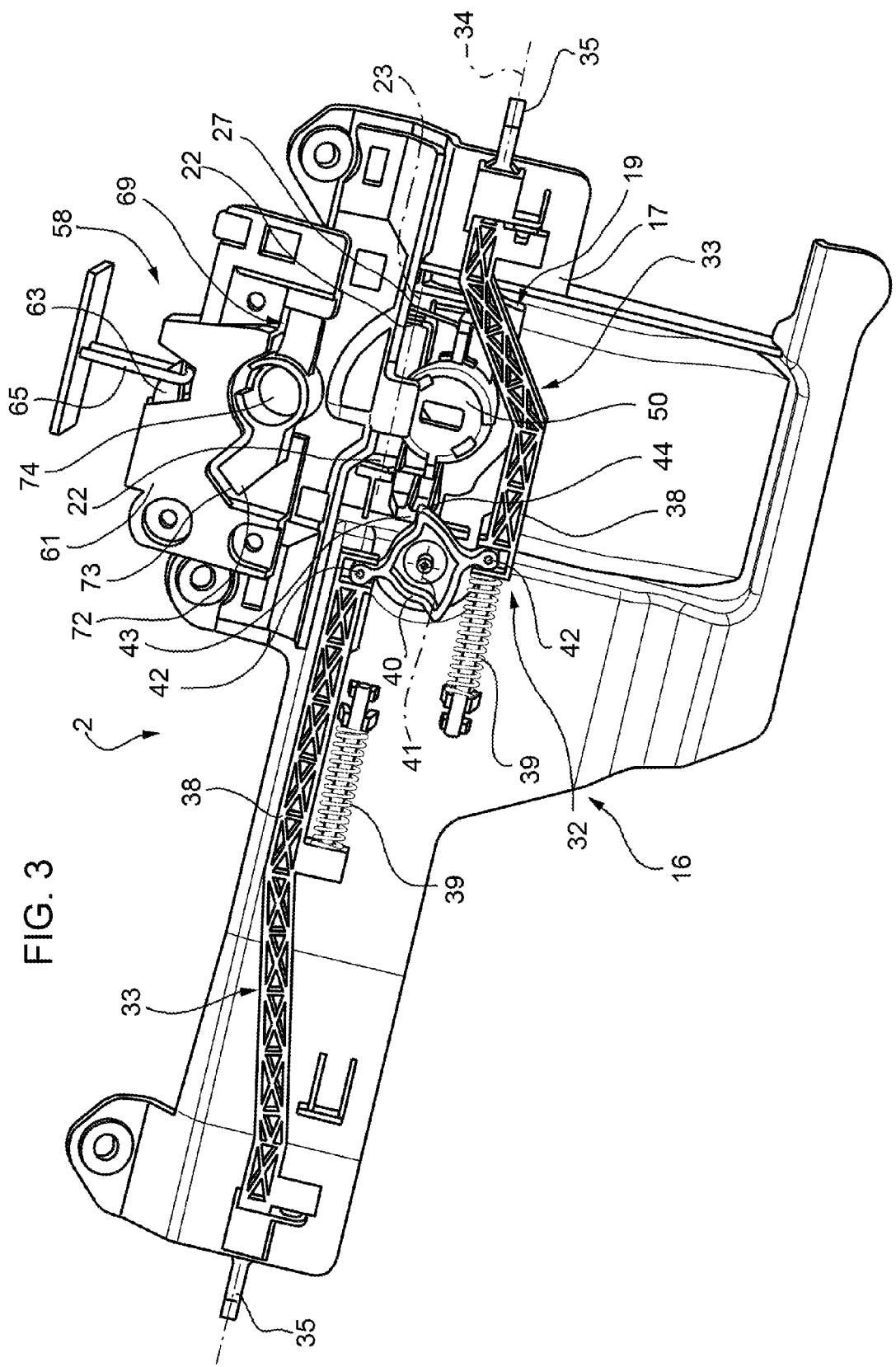

With reference to FIGS. 2 and 3, the module 16 also comprises a retaining device 32 to hold the door 11 in the closed position. The device 32 is housed in the cavity 18 and comprises two rods 33, the outer ends of which are aligned in relation to one another along an axis 34 which is parallel to the axis 23 and define respective latches 35.

The rods 33 are joined to the wall 17 so as to slide in opposite directions to one another along the axis 34 between an engaged position and a released position. In the engaged position, the latches 35 protrude laterally with respect to the wall 17 and engage respective side retaining seats (not illustrated), fixed with respect to the wall 5, to hold the door 11 in the closed position; in the released position, the latches 35 are retracted leaving the side retaining seats free so that the compartment 3 can be opened.

The internal ends of the rods 33, i.e. opposite the latches 35, are defined by respective rectilinear portions 38, which are parallel and spaced with respect to one another and are pushed by respective springs 39 towards the engaged position with respect to the wall 17.

The device 32 also comprises a rotor 40, which is joined to the wall 17 so as to rotate about an axis 41 perpendicular to the axis 34 and intersecting the axis 34. The portions 38 of the rods 33 are diametrically opposite and tangent with respect to the axis 41, and are coupled to respective articulated joints 42 defined by radial teeth of the rotor 40.

The device 32 is operated directly by the lever 20. In particular, the motion is transmitted from the lever 20 to the rotor 40 by means of two appendices 43,44 supported in a tangential direction with respect to the axis 41. The appendix 44 is defined by a radial tooth of the rotor 40, while the appendix 43 extends in a fixed position from a rear face of the plate 20a, and pivots downwardly about the axis 23 when the plate 20a is raised by the user (in the anti-clockwise direction in FIG. 1). Said rotation causes the tooth 44 to be pushed downwards, thus making the rotor 40 turn (in the clockwise direction in FIG. 3), with the consequent translation of the rods 33 towards the released position. Once the plate 20a has been left free, the rods 33 automatically return to the engaged position and the lever 20 returns to the home position, due to the action of the springs 39 and 27.

With reference to FIG. 1, the module 16 also comprises a lock 50, which is connected to the lever 20, extends in a cantilevered fashion from the plate 20a towards the wall 15 along an axis 51 that is perpendicular to the plate 20a, and which can be operated by means of a key to turn a locking element 52 about the axis 51 with respect to the lever 20. The element 52 is arranged in the cavity 18, it is joined to an axial end of the lock 50, and is pivotable between a disengaged position and a locking position. The element 52 comprises two appendices 53,54, which engage against a shoulder 55 of the wall 15 and, respectively, against a shoulder 56 of the button 21 when the element 52 is in the locked position, in order to prevent the lever 20 from pivoting to the raised position and, respectively, the button 21 from translating to the retracted position.

Figure 4:
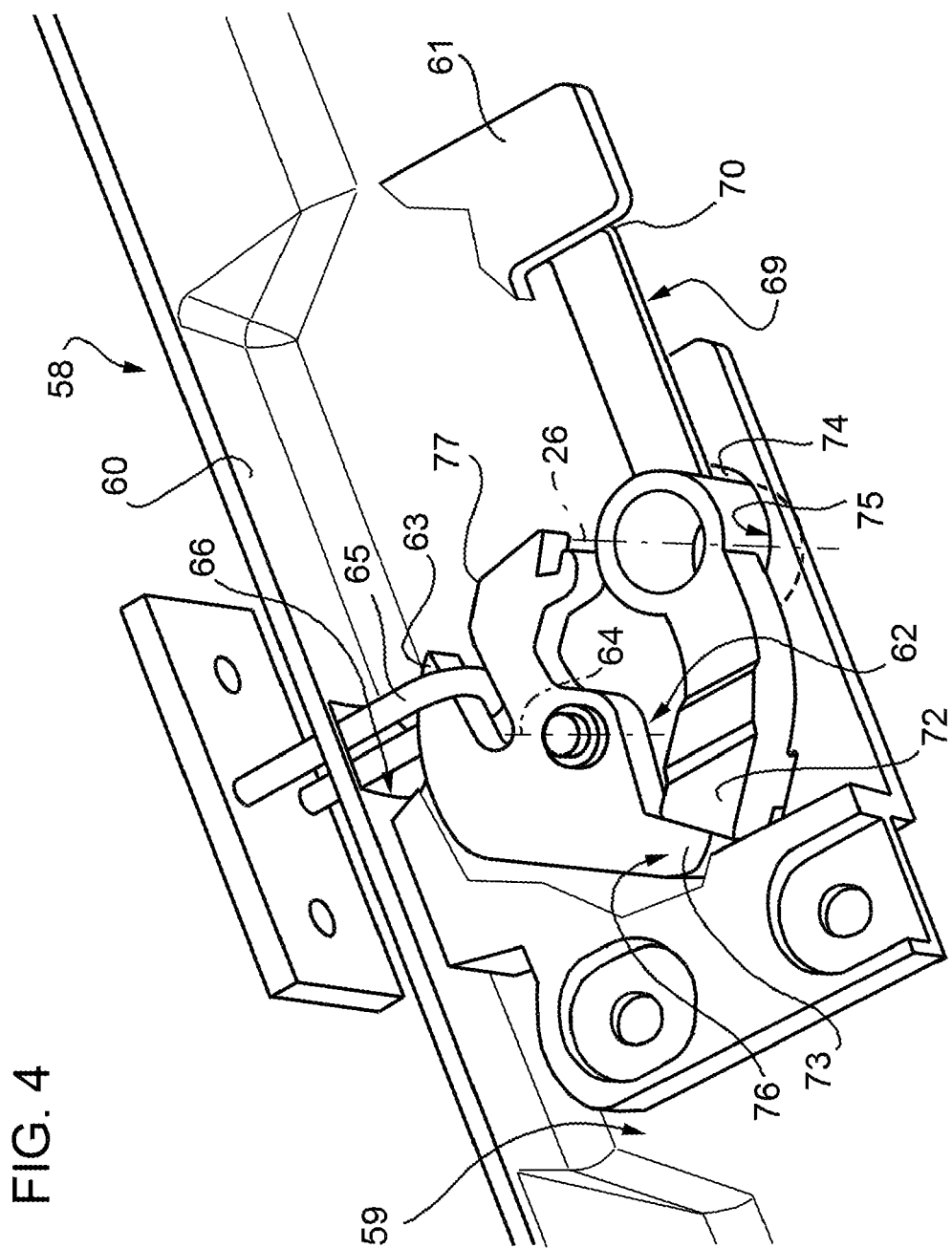
FIG. 4 is a perspective view, on an enlarged scale, of a detail of FIG. 1.

With reference to FIGS. 1 and 4, the assembly 2 comprises a retaining device 58 to hold the door 12 in the closed position. The device 58 is housed in a cavity 59, which is arranged vertically between the compartments 3,4 and is defined, towards the passenger compartment, by a portion 60 of the wall 5. The device 58 comprises a support element 61 fixed to the portion 60; and a disk 62 comprising a radial tooth that defines a latch 63. The disk 62 is pivotally connected to the support element 61 so as to pivot about an axis 64 between an engaged position and a released position. In the engaged position, the latch 63 engages a keeper 65, which is fixed to the door 12 and defines a ring that protrudes from a lower end of the door 12 and, when the door 12 is in the closed position, engages the cavity 59 passing through a slot 66 obtained in the portion 60; in the released position (not illustrated), the latch 63 disengages the keeper 65.

The device 58 comprises a stay 69 defined by an arm, which is essentially tangential with respect to the axis 64 and comprises an end 70 which is fixed to the support element 61 and an opposite end 72. The arm 69 is elastically flexible along a plane parallel to the axis 64 between a non-deformed condition and a deformed condition. In the non-deformed condition, the end 72 is adjacent to the support element 61 and defines a shoulder against which a radial tooth 73 of the disk 62 rests tangentially, to hold the disk 62 in the engaged position against the action of an elastic element (not illustrated). In the deformed condition, the end 72 is at a distance from the support element 61 so that the disk 62 is free to rotate towards the disengaged position under the action of its elastic element.

The arm 69 is bent into the deformed condition simply by pressing a control portion 74 that protrudes from an intermediate portion of the arm 69. The control portion 74 thus defines a button, is fixed with respect to the arm 69, extends essentially along the axis 26 through an opening 75 obtained in the support element 61 and in the portion 60, and faces and is adjacent to the tip of the rod 30 (FIG. 1). The control portion 74 transmits the open command from the button 21 to the latch 63 when the door 11 is in the closed position; when the door 11 is in the open position it remains visible and can be operated directly by a user.

When the pressure on the control portion 74 is released, the end 72 rests on an axial face 76 of the tooth 73, in a manner that is not illustrated. When the door 12 is moved back into the closed position, the keeper 65 rests against a radial tooth 77 of the disk 62, exerts a tangential pushing action with respect to the axis 64, thus making the disk 62 rotate towards the engaged position (in the clockwise direction in FIG. 4). During said rotation, when the tooth 73 moves past the end 72 and, thus the end 72 can descend from the face 76, the arm 69 is elastically released into the non-deformed condition and goes back to retain the disk 62 angularly in the engaged position.

As mentioned previously, the door 12 can also be opened when the door 11 is closed and hides the control portion 74, by manually pressing the button 21, which causes the arm 69 to bend via the transmission defined by the control portion 74 and by the rod 30.

The lock 50 can be used to lock the doors 11 and 12 in the closed position, by turning the key of the lock 50 by 90°. In the locked position, the element 52 blocks the lever 20 (since the appendix 53 engages the shoulder 55 and prevents the lever 20 from turning towards the outside) and at the same time blocks the button 21 (since the appendix 54 opposes the retraction of the button 21, thus preventing the activation of the control portion 74).

From the description above it is apparent that the assembly 2 allows the outer edge of the doors 11, 12 and the shape of the compartments 3,4 to be designed in an extremely flexible manner, in that both the controls defined by the lever 20 and by the button 21, and preferably also the lock 50 with the locking element 52, are arranged on the door 11. In particular, the portion 60 does not need to be directly accessible when the doors 11, 12 are in the closed position.

Moreover, the cavity 59 between the compartments 3,4 only houses the device 58, and not the device 32 and/or the lock 50 with the element 52, and is therefore relatively small. Moreover, the transmission defined by the rod 30 and by the control portion 74 is simple and not particularly bulky and allows the compartments 3,4 to be kept close to one another.

Moreover, the assembly 2 is relatively simple to assemble, in that the module 16 and the device 58 can be assembled in advance and mounted on the walls 15 and, respectively, 5.

Lastly, it is clear that modifications and variations may be made to the assembly 2 described and illustrated herein without departing from the scope of the present invention, as set forth in the appended claims.

In particular, the command sent via the button 21 to the device 58 could be transmitted using transmission means other than the rod 30 and the control portion 74; and/or the device 32 could also be fixed with respect to the wall 5; and/or the lock 50 could be borne on a portion of the wall 17, instead of on the control element 20; and/or the releasing of the device 32 could be controlled by means of components other than the appendices 43,44 described above.

The invention claimed is:

1. A glove box assembly for a dashboard of a motor vehicle; said glove box assembly comprising:
    a first and a second glove box compartment adjacent to one another;
    a first and a second door movable between an open position and a closed position, wherein the first door is configured to open/close the first glove box compartment, wherein the second door is configured to open/close the second glove box compartment;
    a first manually operable control element;
    a second manually operable control element;
    a first retaining device configured to hold the first door in the closed position, wherein the first retaining device is releasable by operating the first control element to open the first door;
    a second retaining device configured to hold the second door in the closed position, wherein the second retaining device is releasable by operating the second control element to open the second door;
    wherein said first and second control elements are borne on said first door; and wherein the glove box assembly comprises a transmission device configured to transmit a release command from said second control element to said second retaining device when said first door is in the closed position.

2. The glove box assembly according to claim 1 further comprising a single lock borne on said first door, and a locking element movable in response to the operation of said lock between an inactive position and at least a locking position, in which the locking element blocks both said retaining devices and said control elements.

3. The glove box assembly according to claim 2, wherein said locking element is borne on said first door.

4. The glove box assembly according to claim 3, wherein said first control element is defined by a control lever pivotally connected to said first door and bearing said lock; said locking element being borne on said lock and being pivotable with respect to said control lever between said released and locked positions.

5. The glove box assembly according to claim 4, wherein said lock comprises a first appendix configured to engage against a first shoulder of said first door and a second appendix configured to engage against a second shoulder of said second control element when said lock is in the locked position.

6. The glove box assembly according to claim 1, wherein said transmission device comprises a control portion which is manually operable directly by the user to control the opening of said second retaining device when said first door is in the open position.

7. The glove box assembly according to claim 6, wherein the second control element and said control portion are defined by respective buttons configured essentially coaxial in relation to one another when said first door is in the closed position.

8. The glove box assembly according to claim 1, wherein said second retaining device is borne on a fixed support portion arranged between said first and second glove box compartments.

9. The glove box assembly according to claim 8, wherein said second retaining device comprises:
    a retaining member movable between an engaged position, in which the retaining member holds said second door in the closed position, and a released position, in which the retaining member leaves said second door free;
    elastic means for releasing said retaining member into the released position;
    a stop element movable under the action of said transmission device from a first position, in which the stop element blocks said retaining member in the engaged position, towards a second position, in which the stop element releases said retaining device.

10. The glove box assembly according to claim 9, wherein said stop element comprises a flexible arm, and wherein said transmission device comprises a control portion fixed with respect to said flexible arm.

11. The glove box assembly according to claim 9, wherein said retaining member is defined by a rotatable disk comprising a latch which is engageable with a keeper of said second door, and a shaped radial tooth; said keeper being arranged so as to push said radial tooth tangentially when said second door is moved into the closed position, so as to turn said disk towards the engaged position.

* * * * *